United States Patent [19]
Benson et al.

[11] Patent Number: 6,080,340
[45] Date of Patent: Jun. 27, 2000

[54] MACHINING TECHNIQUES FOR RETROREFLECTIVE CUBE CORNER ARTICLE AND METHOD OF MANUFACTURE

[75] Inventors: Gerald M. Benson, Woodbury; Kenneth L. Smith, White Bear Lake, both of Minn.

[73] Assignee: 3M Innovative Properties Company, St. Paul, Minn.

[21] Appl. No.: 08/719,191

[22] Filed: Sep. 24, 1996

Related U.S. Application Data

[63] Continuation of application No. 08/139,920, Oct. 20, 1993, Pat. No. 5,600,484.

[51] Int. Cl.[7] ............................ B29D 11/00; G02B 5/122; B24B 1/00
[52] U.S. Cl. ............................ 264/2.7; 264/1.9; 264/138; 264/162; 359/529; 359/530; 359/535
[58] Field of Search .................................... 359/529, 530, 359/535, 538, 548; 264/1.1, 1.9, 255, 219, 227, 2.5, 2.7, 138, 162; 156/245; 428/156, 161; 425/808

[56] References Cited

U.S. PATENT DOCUMENTS

| | | | |
|---|---|---|---|
| 1,591,572 | 7/1926 | Stimson | 65/362 |
| 2,027,441 | 1/1936 | Landis | 41/34 |
| 2,310,790 | 2/1943 | Jungersen | 359/547 |
| 2,407,680 | 9/1946 | Palmquist et al. | 359/538 |
| 3,190,178 | 6/1965 | McKenzie | 359/14 |
| 3,417,959 | 12/1968 | Schultz | 249/117 |
| 3,684,348 | 8/1972 | Rowland | 359/530 |
| 3,689,346 | 9/1972 | Rowland | 156/245 |
| 3,712,706 | 1/1973 | Stamm | 359/531 |
| 3,810,804 | 5/1974 | Rowland | 156/245 |
| 3,811,983 | 5/1974 | Rowland | 156/245 |
| 3,873,184 | 3/1975 | Heenan | 350/103 |
| 3,922,065 | 11/1975 | Schultz | 359/14 |
| 3,924,929 | 12/1975 | Holmen et al. | 359/514 |
| 3,926,402 | 12/1975 | Heenan | 204/281 |
| 4,025,159 | 5/1977 | McGrath | 350/105 |
| 4,202,600 | 5/1980 | Burke et al. | 359/514 |
| 4,208,090 | 6/1980 | Heenan | 359/514 |
| 4,243,618 | 1/1981 | Van Arnam | 264/1 |
| 4,332,437 | 6/1982 | Searight et al. | 350/103 |
| 4,349,598 | 9/1982 | White | 428/161 |
| 4,498,733 | 2/1985 | Flanagan | 350/102 |
| 4,576,850 | 3/1986 | Martens | 428/156 |
| 4,582,885 | 4/1986 | Barber | 528/28 |
| 4,588,258 | 5/1986 | Hoopman | 359/514 |
| 4,618,518 | 10/1986 | Pricone et al. | 428/40 |
| 4,668,558 | 5/1987 | Barber | 428/156 |
| 4,703,999 | 11/1987 | Benson | 350/103 |
| 4,726,706 | 2/1988 | Attar | 404/14 |
| 4,801,193 | 1/1989 | Martin | 359/514 |
| 4,895,428 | 1/1990 | Nelson et al. | 359/514 |
| 4,938,563 | 7/1990 | Nelson et al. | 350/103 |
| 4,952,023 | 8/1990 | Bradshaw et al. | 350/102 |
| 5,122,902 | 6/1992 | Benson | 359/529 |
| 5,138,488 | 8/1992 | Szczech | 359/530 |
| 5,171,624 | 12/1992 | Walter | 428/156 |
| 5,237,449 | 8/1993 | Nelson et al. | 359/529 |
| 5,272,562 | 12/1993 | Coderre | 359/529 |
| 5,450,235 | 9/1995 | Smith et al. | 359/529 |

FOREIGN PATENT DOCUMENTS

| | | |
|---|---|---|
| 0 269 329 A2 | 6/1988 | European Pat. Off. . |
| 92 17 179 | 4/1993 | Germany . |
| 423464 | 2/1935 | United Kingdom . |
| 441319 | 1/1936 | United Kingdom . |

*Primary Examiner*—Jan H. Silbaugh
*Assistant Examiner*—Suzanne E. Mason
*Attorney, Agent, or Firm*—Kevin W. Raasch; Robert H. Jordan; Stephen C. Jensen

[57] ABSTRACT

A method of machining a substrate to produce a cube corner element optical array. The method includes steps of directly machining a plurality of groove sets into a directly machinable substrate to form an array having a plurality of geometric structures including cube corner elements, and machining at least two of the groove sets along the same path in the substrate but at different depths of groove to produce a geometric structure side surface having both an optical portion and a non-optical portion.

14 Claims, 8 Drawing Sheets

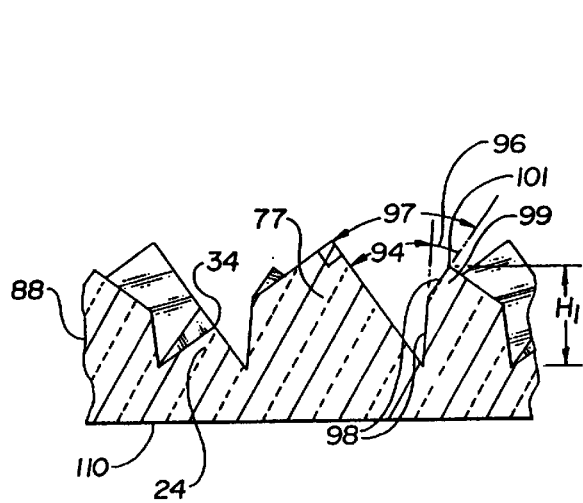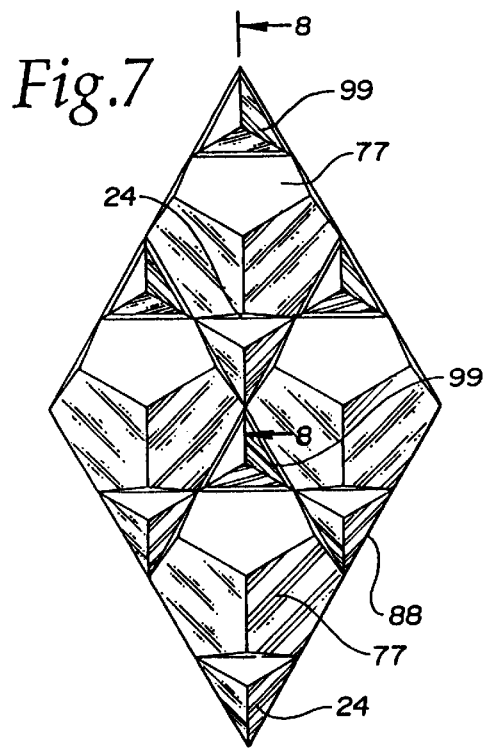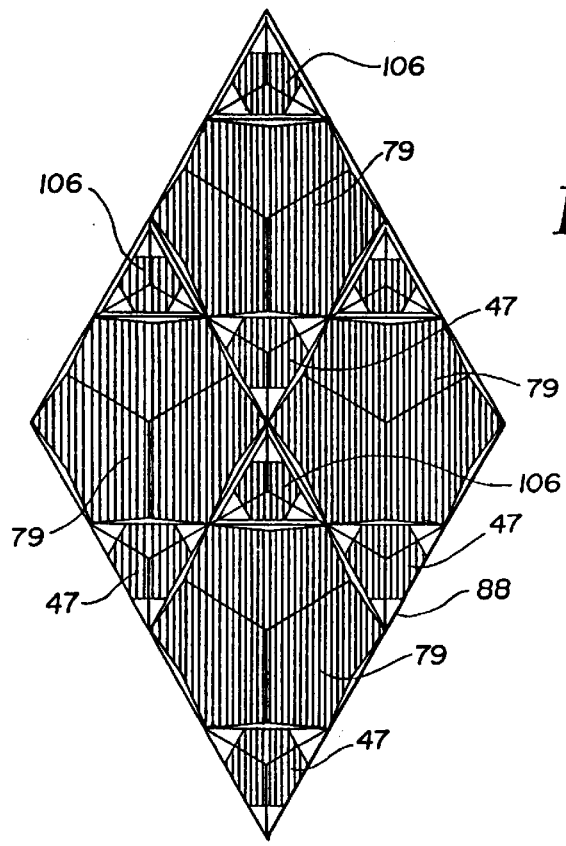

Fig.14
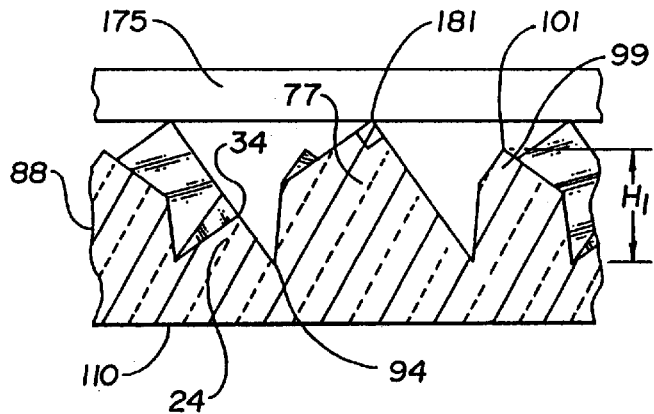
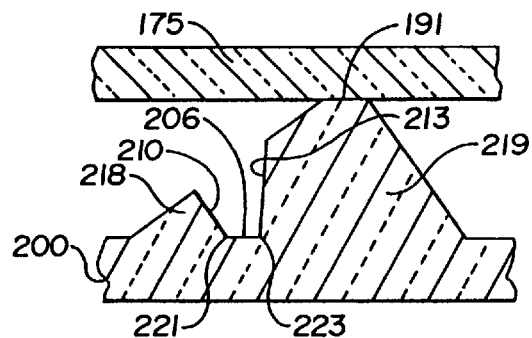
Fig.15
Fig.16
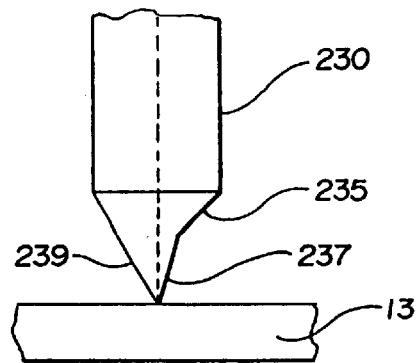

MACHINING TECHNIQUES FOR RETROREFLECTIVE CUBE CORNER ARTICLE AND METHOD OF MANUFACTURE

This is a continuation of application Ser. No. 08/139,920 filed Oct. 20, 1993 now U.S. Pat. No. 5,600,484.

FIELD OF THE INVENTION

This invention relates to retroreflective cube corner element articles having prismatic retroreflective elements.

BACKGROUND OF THE INVENTION

Many types of retroreflective elements are known, including prismatic designs incorporating one or more geometric structures commonly known as cube corners. Retroreflective sheeting which employs cube corner type reflecting elements is well-known. Cube corner reflecting elements are trihedral structures which have three approximately mutually perpendicular lateral faces meeting in a single corner. Light rays are typically reflected at the cube faces due to either total internal reflection or reflective coatings. The manufacture of directly machined arrays comprising retroreflective cube corner elements has many inefficiencies and limitations. Percent active aperture, flexibility, and manufacturing ease are adversely affected by these limitations, and overall production costs versus performance are often higher relative to the new class of articles and methods of manufacture taught below.

SUMMARY OF THE INVENTION

The invention comprises a method of manufacturing a cube corner article comprising the steps of providing a machinable substrate of material suitable for forming reflective surfaces, and creating a plurality of geometric structures including cube corner elements in the substrate by directly machining at least two sets of parallel grooves in the substrate. The direct machining forms at least one geometric structure side surface having both an optical portion and a non-optical portion.

The invention also comprises a method of machining a cube corner article comprising the steps of providing a directly machinable substrate in which a plurality of initial groove sets are machined to produce a plurality of geometric structures including cube corner elements, and adjusting the height of at least one of the geometric structures by directly machining at least one additional groove in at least one groove set.

The invention also comprises a method of machining a cube corner article comprising the steps of providing a directly machinable substrate in which a plurality of groove sets are machined to produce a plurality of geometric structures including cube corner elements, and machining at least one of the grooves in each of at least two of the groove sets along partially overlapping paths in the substrate but at different depths of groove to form a final groove.

The invention also comprises a retroreflective cube corner article which is a replica of a directly machined substrate in which a plurality of geometric structures including cube corner elements are machined in the substrate. At least one of the geometric structures is height adjusted by directly machining at least one additional groove in at least one groove set.

The invention also comprises a retroreflective cube corner article which is a replica of a directly machined substrate in which a plurality of geometric structures including cube corner elements are machined in the substrate. Each geometric structure is bounded by at least one groove from each of at least two sets of parallel final grooves in the substrate, and at least one geometric structure comprises a side surface having both an optical portion and a non-optical portion.

The invention also comprises a retroreflective cube corner element composite sheeting comprising a plurality of zones of geometric structures including retroreflective cube corner elements. Each zone comprises a replica of a directly machined substrate in which a plurality of initial groove sets are machined to produce a plurality of geometric structures including cube corner elements. The composite sheeting comprises at least one zone with height adjusted geometric structures including cube corner elements formed by directly machining at least one additional groove in at least one groove set.

The invention also comprises a retroreflective cube corner element composite sheeting comprising a plurality of zones of geometric structures including retroreflective cube corner elements. Each zone comprises a replica of a directly machined substrate in which a plurality of cube corner elements are bounded in the substrate by a plurality of grooves from a plurality of groove sets. The composite sheeting comprises at least one zone with at least one geometric structure side surface having both an optical portion and a non-optical portion.

BRIEF DESCRIPTION OF THE DRAWINGS

FIG. 7 is a plan view of a directly machined retroreflective cube corner element array.

FIG. 8 is a section elevational view taken along line 8—8 in FIG. 7.

FIG. 9 is a plan view of some of the active apertures of the array shown in FIG. 7 and FIG. 8.

FIG. 14 is a section elevational view depicting use of a sealing medium.

FIG. 15 is a section elevational view depicting a retroreflective cube corner element array having a separation surface.

FIG. 16 is a schematic view of a machine tool for grooving directly machined arrays.

DETAILED DESCRIPTION OF THE INVENTION

The manufacture of retroreflective cube corner element micro-cube arrays is accomplished using molds made by different techniques, including those known as pin bundling and direct machining. Molds manufactured using pin bundling are made by assembling together individual pins which each have an end portion shaped with features of a cube corner retroreflective element. Examples of pin bundling include U.S. Pat. No. 3,926,402 to Heenan et al., and United Kingdom Patents 423,464 and 441,319 to Leray.

The direct machining technique, also known generally as ruling, comprises cutting portions of a substrate to create a pattern of grooves which intersect to form cube corner elements. The grooved substrate is referred to as a master from which a series of impressions, i.e., replicas, may be formed. In some instances, the master is useful as a retroreflective article, however, replicas, including multigenerational replicas, are more commonly used as a retroreflective article. Direct machining is an excellent method for manufacturing master molds with small micro-cube arrays. Micro-cube arrays are particularly beneficial for producing thin replica arrays with improved flexibility. Micro-cube arrays are also conducive to continuous process manufacturing. The process of manufacturing large arrays is also relatively easier using direct machining methods rather than other techniques. Examples of direct machining are shown in U.S. Pat. No. 4,588,258, issued to Hoopman, and U.S. Pat. No. 3,712,706 issued to Stamm, which disclose single or multiple passes of a machine tool having two opposing cutting surfaces for cutting grooves to form cube corner optical faces in a substrate. An example of direct machining involving only two sets of grooves is shown in U.S. Pat. No. 4,895,428 to Nelson et al.

Figure 1:
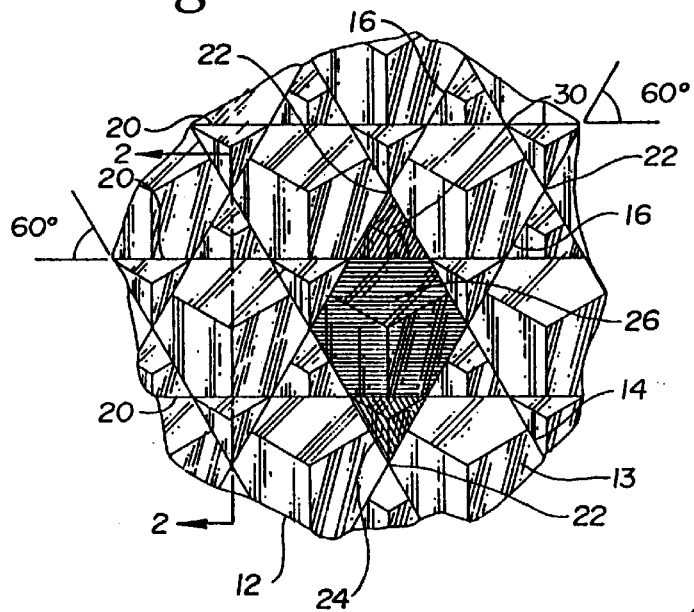
FIG. 1 is a plan view of a directly machined three groove set retroreflective cube corner element array.

FIG. 1 discloses one embodiment of a retroreflective cube corner element array 12 manufactured from a directly machinable substrate 13 by use of at least three groove sets each comprising a plurality of parallel non-overlapping grooves. Preferably, secondary groove sets consisting of evenly spaced secondary grooves 14, 16, are arranged in non-parallel relation, and a primary groove set consists of a plurality of parallel evenly spaced primary grooves 20 centered between secondary groove intersections 22. An alternate embodiment groove spacing comprises varied rather than evenly spaced grooves. In the embodiment disclosed in FIG. 1, a plurality of raised discontinuous geometric structures including retroreflective cube corner elements are formed. In this Figure the intersections of the grooves within two groove sets are not coincident with at least one groove in a third groove set. Also, the separation between the intersections of the grooves within two groove sets with at least one groove in a third groove set is preferably greater than about $1 \times 10^{-2}$ millimeters. All of these geometric structures are similar to cube corner elements 24, 26, and 30. FIG. 1 illustrates a multiple structure array in which the cube corner elements ate shown formed from primary and secondary grooves with a uniform depth of cut. The grooves intersect with included angles of 60°.

Figure 2:
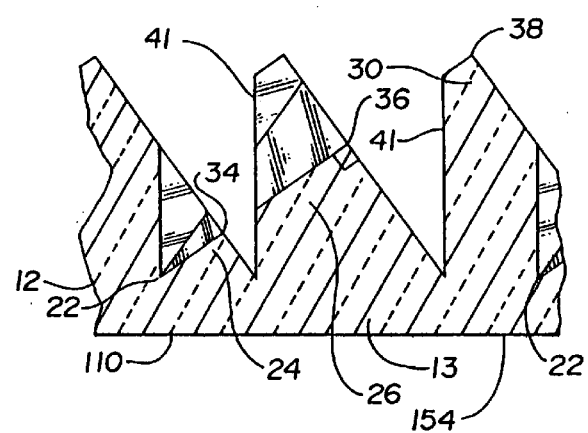
FIG. 2 is a section elevation view taken along line 2—2 of FIG. 1.

FIG. 2 is a cross section elevation view taken along lines 2—2 of FIG. 1. FIG. 2 illustrates the difference in heights of cube peaks 34, 36, and 38 corresponding to cube corner elements 24, 26, and 30. Cube peak 38 illustrates a very high point of the directly machined substrate relative to all other surfaces. In addition, formation of the structure depicted in FIG. 1 and FIG. 2 results in vertical surfaces 41 which create difficulties during processing of arrays of this type. Vertical surfaces contribute to interlocking of mating faces during replication of these arrays, which in turn results in labor inefficiencies, material waste, and slow down of manufacturing.

Figure 3:
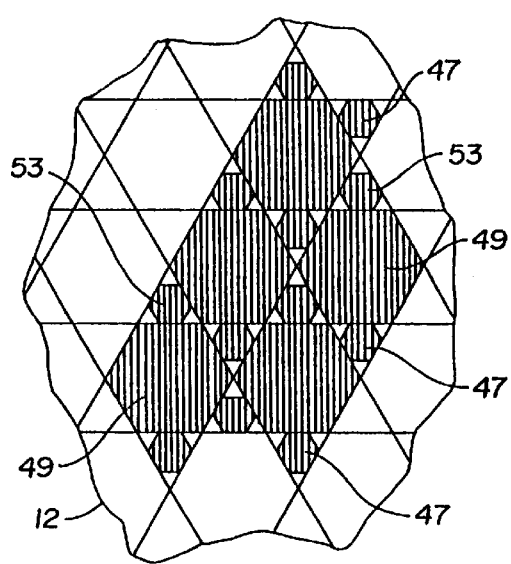
FIG. 3 is a plan view of some of the active apertures of the array shown in FIGS. 1 and 2.

For these arrays, optical performance is conveniently defined by the percent of the surface area that is actually retroreflective, i.e. which comprises an effective area or active aperture. The percent active aperture varies as a function of the amount of canting, refractive index, and the entrance angle. The structure of array 12 shown in FIG. 1 and FIG. 2 demonstrates an exceptional approximately 91% active aperture, as schematically shown in the percent active aperture depiction of FIG. 3. FIG. 3 also depicts multiple active aperture sizes which result when using the geometric structures and method of manufacturing described above. In particular, differently sized apertures 47, 49, and 53, are intermixed and arranged in close proximity, and correspond to the different types of retroreflective cube corner elements 24, 26, and 30 shown in FIG. 1. Array 12 is quite useful in applications requiring high brightness at zero or low entrance angles such as photoelectric sensors, traffic control materials, directional reflectors, and retroreflective markings.

Figure 4:
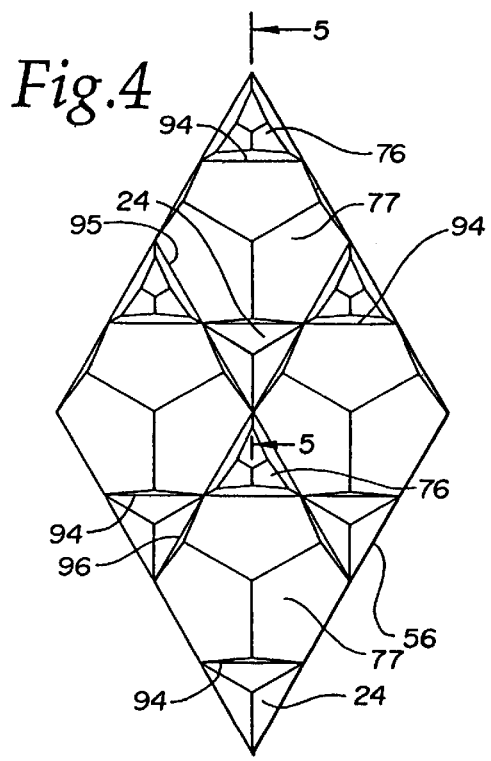
FIG. 4 is a plan view of a directly machined multiple groove set array having a 3° relief angle.
Figure 5:
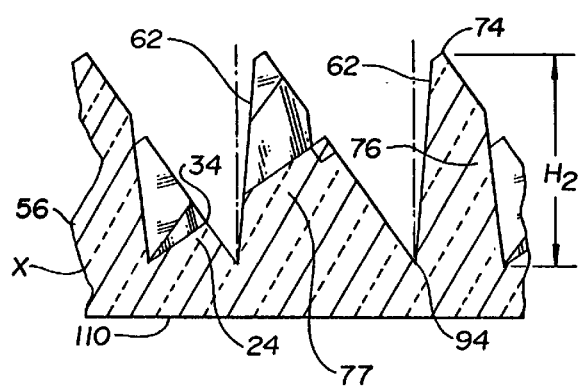
FIG. 5 is a section elevation view taken along line 5—5 in FIG. 4.

FIG. 4 discloses retroreflective cube corner element array 56 formed using multiple groove sets in similar manner to that shown and described above in relation to FIG. 1 to create retroreflective cube corner elements 24, 76, and 77. However, array 56 is formed by machining each of the grooves 94, 95, 96 with a 3° relief angle. As shown in FIG. 5, this relief angle results in a less vertical orientation of surface 62 as compared with surface 41, shown in FIG. 2. This less vertical orientation of surface 62 enhances ease of manufacturing and permits considerable improvements during the replication process of array 56.

Figure 6:
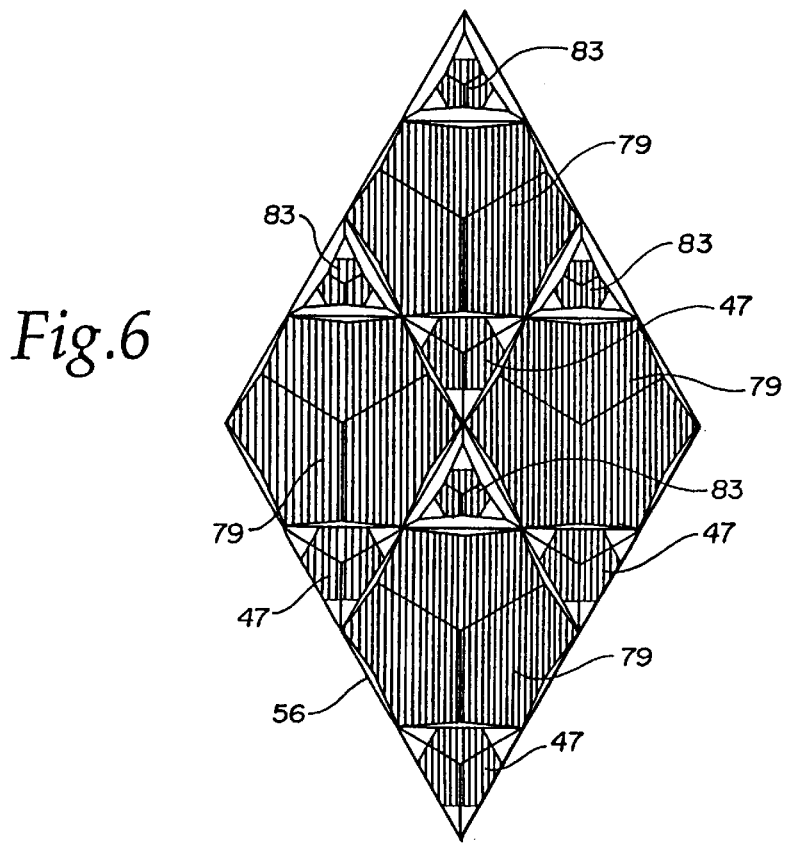
FIG. 6 is a plan view of some of the active apertures of the array shown in FIG. 4.

Use of a relief angle also results in a reduction in percent active aperture corresponding to such arrays. As shown in FIG. 6, array 56 comprises multiple differently sized and shaped apertures 47, 79, and 83. As shown in FIG. 3, the apertures depicted in FIG. 6 are also intermixed and arranged in close proximity to provide relatively high brightness at low entrance angles. However, the maximum percent active aperture of array 56 is reduced to only about 84% due to the use of relief angles eliminating some optical surface area. Increased relief may be utilized to further enhance ease of manufacturing and replication, but it also results in additional reduction in maximum percent active aperture. Sufficiently large relief angles may lower some of the higher structures within arrays. However, the resulting trihedral structures will no longer be cube corner retroreflective elements.

FIG. 7 discloses yet another embodiment of a retroreflective cube corner element array 88 manufactured in similar manner to array 12 and array 56 with a plurality of secondary and primary grooves. Single or multiple passes of a machine tool may be used to produce the shape of the grooves which form geometric structure side surfaces which may include cube corner element optical surfaces. Final grooves form all the geometric structure side surfaces and may be comprised of one or more grooves. Directly machined array 88 is substantially identically formed as array 56, with the exception of further adjusting the height of at least one of the structures formed in the array. This is accomplished in one of several different possible manners. One embodiment comprises machining a plurality of groove sets to produce a plurality of geometric structures including cube corner elements, and machining at least one of the grooves in each of at least two of the groove sets along overlapping or partially overlapping paths in the substrate but at different depths of groove. Another embodiment comprises creating a plurality of geometric structures including cube corner elements by directly machining at least two sets of parallel grooves in the substrate so that groove machining forms a final groove with at least one geometric structure side surface having both an optical portion and a non-optical portion. In this context, "optical portion" refers to a surface which is actually retroreflective at some entrance angle. Preferably, these portions intersect along an axis that is parallel to the axis of the groove(s) which form the geometric structure side surface. This may be accomplished using a novel machine tool to form the final groove using only two groove sets, or by simply using more than two groove sets to form the final groove, as described below.

For example, primary groove 94 shown originally in FIG. 5 and also partially in FIG. 8, is machined into substrate 13. Then, in a subsequent processing step, an appropriate machine tool forming a subsequent groove 96 is passed through the substrate in an overlapping or partially overlapping manner to the primary groove path or substantially parallel to primary groove 94 at a depth sufficient to reduce the height of cube corner element 76 (FIG. 5) but not to a depth which would cut optical surfaces of other previously formed cube corner elements, such as elements 24 and 77. It is recognized that in this subsequent processing step, which comprises a subsequent groove set, a groove 96 is formed in partial overlap of groove 94. Groove 96 is likely to be formed only by cutting substrate surfaces on one side of previous groove 94. The included angle of groove 96 may be of any value although it should preferably not cut surfaces of adjacent cube corner elements. This results in final groove 97, shown in FIG. 8 in side view, which is the product of the machining operations which form the final surfaces of geometric structures along the groove. Similar additional machining operations may be performed on the surfaces along the secondary groove sets. As shown in FIG. 8, the height $H_1$ of the cube corner element depicted as cube corner element 76 in FIG. 5 and now formed in a new shape as cube corner element 99 with a peak 101 is less than height $H_2$ of cube corner element 76. Final groove 97 forms at least one geometric structure side surface 98 which has both an optical portion and a non-optical portion, i.e. a surface that is not one of the three substantially orthogonal surfaces which form a cube corner.

Adjustment of the height of at least one of the cube corner elements by use of direct machining techniques provides substantial processing advantages, and improves mechanical and optical performance. A lower height eases the separation of replicates from master arrays during the replication process. Indeed, the replication quality is also greatly improved with a thinner, height reduced array. Reduction of the height also generally results in an overall thinner construction array 88 than those described above in relation to FIGS. 1–6. This enhances the ease of manufacturing, processing, and handling. In addition, a thinner array, yet one which comprises substantial optical advantages over known arrays, is advantageous in order to reduce the effect of vignetting, which otherwise reduces the amount of light against the optical retroreflective surfaces of the array due to the channel effect of a very long (e.g. high) structure through which the light must travel.

Another advantage of adjusting the height using the novel cutting methods described above is the increased percent active aperture of resulting arrays, particularly for arrays using non-zero relief angles. These arrays may exhibit up to about a maximum of 91% active aperture, although this value is reduced when a relief angle is used, for example, as shown in FIG. 8. With the relief angle, array 88 has a maximum percent aperture of about 88%. Increased relief angles could decrease the percent active aperture at zero entrance angle, although it is possible to maintain at least about 70% or greater active aperture using these novel cutting methods. FIG. 9 shows the active apertures, viewed at zero entrance angle, of array 88. The percent active aperture of array 88 is represented by multiple differently sized and shaped apertures 47, 79, and 106. These apertures correspond to cube corner elements 24, 77, and 99. Array 88 may be used in a variety of applications, and is particularly useful for those applications requiring high brightness and improved mechanical flexibility.

Multigenerational replication of cube corner element master arrays is greatly enhanced by use of arrays without vertical surfaces and without deep grooves or high geometric structures. Shorter structures simplify the task of separating a replicate from a master without damaging the optical surfaces. Shorter structures also result in less mechanical interlocking between a replicate and a master. Shorter structures are also less likely to have entrapped bubbles between a replicate and a master, may be processed at lower temperatures than higher structures of the same material, and are compatible with higher speed processing. It is recognized that the highest structures referred to may comprise either cube corner elements or other geometric structures, and that substantial advantages during processing occur when the height of the highest structure is reduced to at least about the height of the next highest structure(s). This, of course, recognizes that the plurality of geometric structures may comprise one or more different geometric structures.

Figure 10:
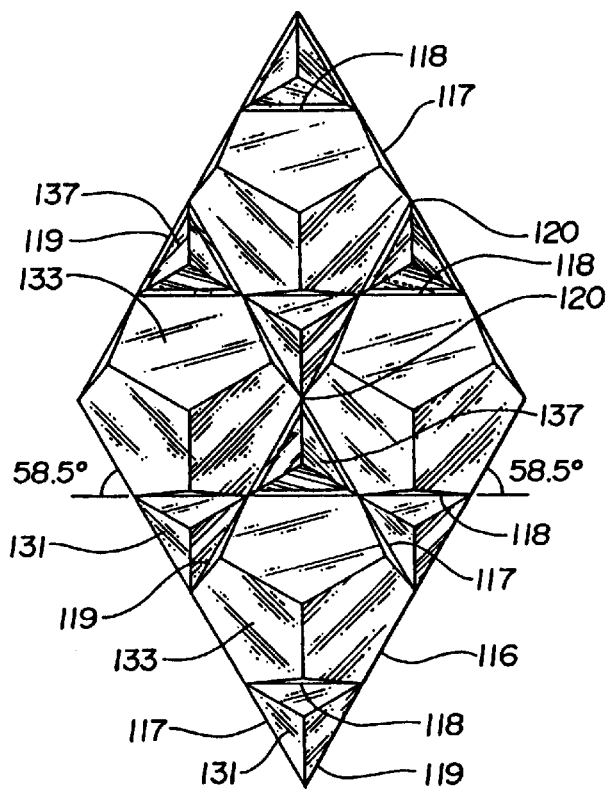
FIG. 10 is a plan view of a directly machined canted retroreflective cube corner element array.

Array 12, array 56, and array 88 are examples of cube corner element retroreflective arrays which comprise non-canted cubes having individual symmetry axes that are perpendicular to a base plane 110. The symmetry axis is a central or optical axis which is a trisector of the internal or dihedral angles defined by the faces of the element. However, in some practical applications it is advantageous to cant or tilt the symmetry axes of the cube corner retroreflective elements to an orientation which is not perpendicular to the base plane. The resulting canted cube corner elements combine to produce an array which retroreflects over a different range of entrance angles. FIG. 10 discloses a canted retroreflective cube corner element array 116 which comprises a plurality of cube corner elements each formed from primary and secondary grooves intersecting with included angles 58.5°-58.5°-63°. Each of the primary grooves 118 and each of the secondary grooves 117, 119, are evenly spaced and have a 3° relief angle. Array 116 has all of the advantages of array 88, but it also exhibits peak brightness at a non-zero entrance angle. This is particularly useful in applications such as highway signage in which a non-zero entrance angle is most likely to occur. The primary grooves 118 are centered between secondary groove intersections 120.

Figure 11:
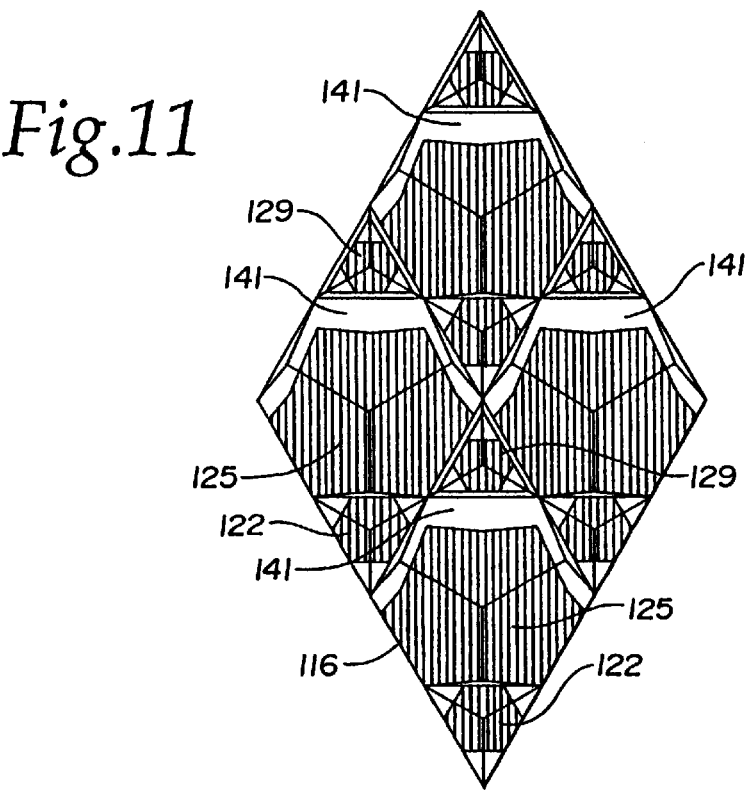
FIG. 11 is a plan view of some of the active apertures of the array shown in FIG. 10 at zero entrance angle.

FIG. 11 discloses the percent active aperture of array 116 at zero entrance angle. Array 116 comprises multiple differently shaped and sized active apertures 122, 125, and 129 corresponding to retroreflective cube corner elements 131, 133, and 137. FIG. 11 illustrates the reduction at 0° entrance angle of percent active aperture, as shown by the size of the non-active zones 141, caused by the canting of array 116.

Figure 12:
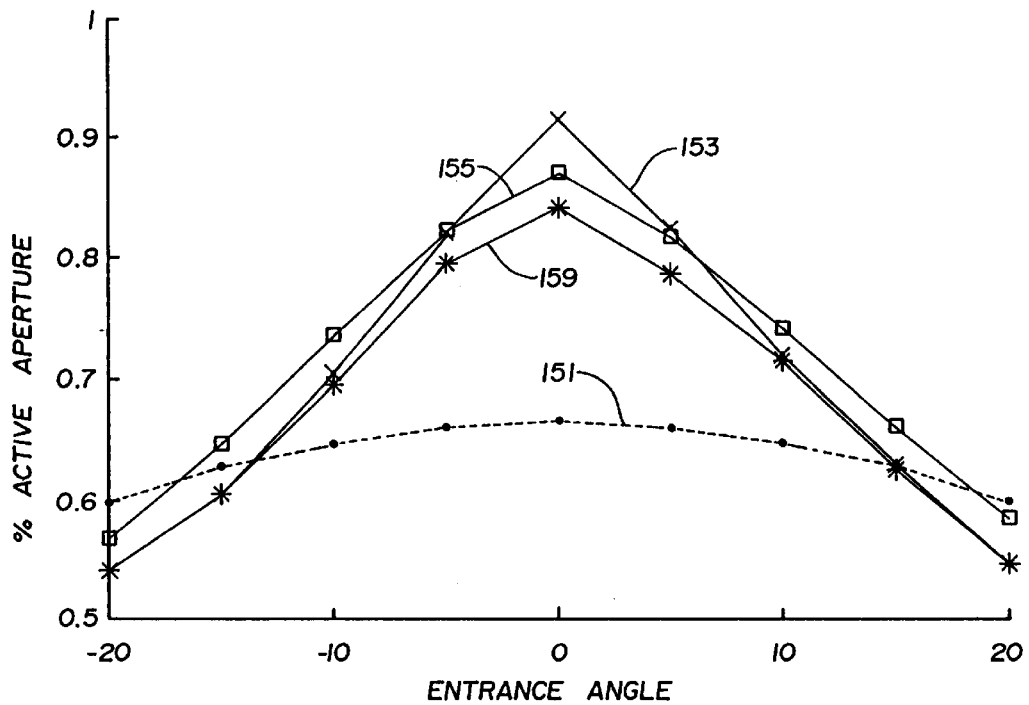
FIG. 12 is a graph depicting percent active aperture versus entrance angle for the arrays shown in FIGS. 1, 4, and 7.

FIG. 12 discloses percent active aperture versus entrance angle for arrays with a refractive index of 1.59 and entrance angles of 0° to ±20° for non-canted arrays. Curve 151 discloses the percent active aperture for a conventional 60°-60°-60° array, such as described in U.S. Pat. No. 3,712, 706 to Stamm. Curve 153 discloses the percent active aperture for the 60°-60°-60° asymmetric array 12 of FIG. 1. Curve 155 discloses the percent active aperture for 60°-60°-60° height-adjusted 3° relief array 88 of FIG. 7, and curve 159 discloses the percent active aperture for 60°-60°-60° non-height adjusted 3° relief array 56 of FIG. 4.

FIG. 12 illustrates a high brightness array having a maximum percent active aperture of about 91%, shown by curve 153, which is achieved in an array formed with grooves having no relief angle. An array with a relief angle improves processability but it also results in a relative reduction of percent active aperture as depicted by curve 159. This reduction in percent active aperture is caused by using grooves with a relief angle without also incorporating any height adjustment to the highest structure(s) in the array. However, as shown in curve 155, improved brightness and processability is possible by providing groove relief angles and by reducing the height of the highest structures within the array. These manufacturing techniques yield significant increase in percent active aperture in a range of between about −15° to about 20° entrance angle for the arrays disclosed above. Additional processing to reduce the height of the highest structure within an array may be used with arrays having a wide range of relief angles, including zero.

Figure 13:
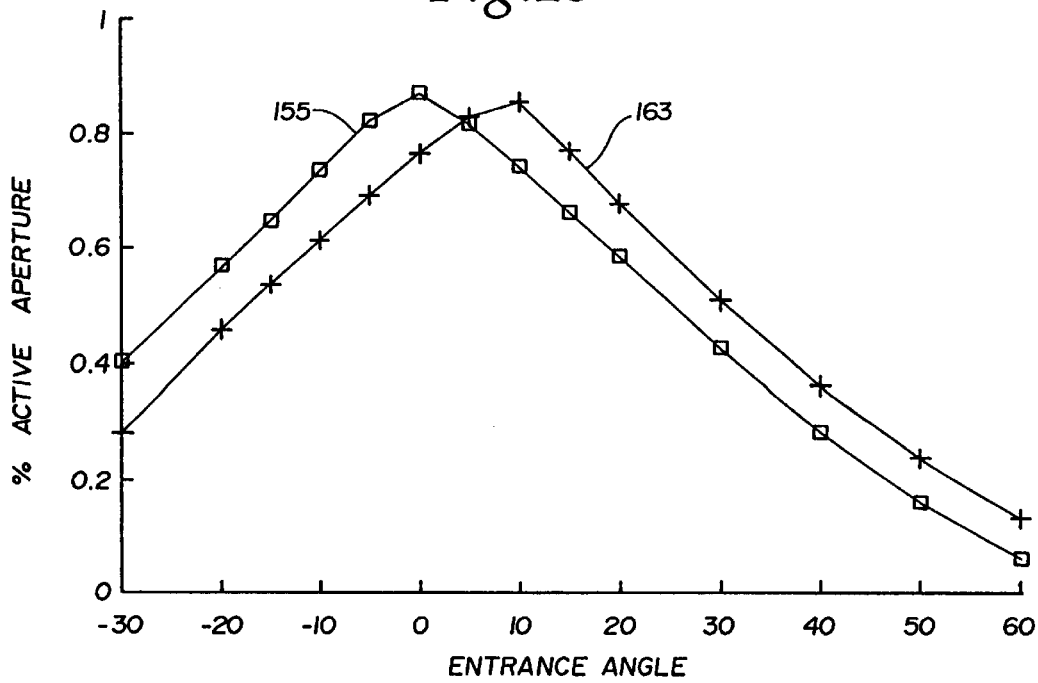
FIG. 13 is a graph depicting percent active aperture versus entrance angle for arrays shown in FIGS. 7 and 10.

FIG. 13 also discloses percent active aperture versus entrance angle for arrays with a refractive index of 1.59. Curve 155 discloses the percent active aperture for the 60°-60°-60° asymmetric 3° relief angle array 88 shown in FIG. 7, which includes a height adjusted groove set, or a controlled depth of cut groove set, either of which produces the novel geometric structure side surface having at least one optical portion and at least one non-optical portion. Curve 163 discloses the percent active aperture for a canted array having retroreflective cube corner elements formed by grooves having included angles of 58.5°-58.5°-63°, corresponding to array 116 shown in FIG. 10. As shown in FIG. 13, curve 163 has substantially identical features to curve 155 except that it achieves peak brightness at a non-zero entrance angle. Both curves 155 and 163 exhibit asymmetric entrance angularity when rotated about an axis within the plane of the substrate. Other amounts of canting may be used advantageously to control the entrance angularity associated with the peak percent active aperture.

Total light return for retroreflective sheeting is derived from the product of percent active aperture and retroreflected light ray intensity. For some combinations of cube geometries, entrance angles, and refractive index, significant reductions in ray intensity may result in relatively poor total light return even though percent active aperture is relatively high. One example is retroreflective cube corner element arrays which rely on total internal reflection of the retroreflected light rays. Ray intensity is substantially reduced if the critical angle for total internal reflection is exceeded at one of the cube faces. Metallized or other reflective coatings on a portion of an array may be utilized advantageously in such situations. For example, a particular portion of an array which has cube surfaces contacting a sealing medium will often be more reflective when the surfaces have a reflective coating. Alternately, a portion may comprise an entire array.

As shown above, retroreflective directly machined cube corner articles are often designed to receive a sealing film which is applied to the retroreflective article in order to maintain a low refractive index material, such as air, next to the retroreflective elements for improved performance. In conventional arrays this medium is often placed in direct contact with the cube corner elements in ways which degrade total light return. However, as shown in FIG. 14, a sealing medium 175 may be placed on the highest surfaces 181 of an array without contacting and degrading the optical properties of lower retroreflective cube corner elements, such as elements 24 and 99. The highest surfaces may comprise cube corner elements, non-retroreflective pyramids, frustums, posts, or other structures. Although slight height variations may result from slight non-uniformity of groove positions or included angle of cube corner elements due to machining tolerances or intentional inducement of non-orthogonality, these variations are not analogous to the variations disclosed and taught in this invention. When using a sealing medium, the highest surface may be shaped, for example as shown by surface 191 in FIG. 15, to both hold the sealing medium and to increase the light transmissivity of the sheeting. Light transmissivity of the sheeting may be increased through use of a transparent or partially transparent sealing medium.

It is also recognized that reduction of height of the highest structures has a dramatic effect on reducing flexural rigidity particularly for cube sheeting utilizing a sealing medium. Even a moderate reduction in thickness of a sheeting has a significant effect on rigidity since flexural rigidity is proportional to the cube of the thickness for a sheet in bending. For example, a 20% reduction in overall thickness will result in roughly a 50%, decrease in flexural rigidity.

FIG. 15 is a schematic side view of another embodiment of the invention. This view shows part of an array 200 similar to a portion of array 88 shown in FIG. 14 but including the use of a separation surface 206. The side surfaces 210, 213 of geometric structures 218, 219 form the boundary edges 221, 223 for the separation surface. The side surfaces may include cube corner element optical surfaces as well as non-optical surfaces on cube corner and other geometric structures. Separation surface 206 may have flat or curved portions when viewed in cross section. Separation surfaces may be advantageously utilized to increase light transmission or transparency in sheeting, including flexible sheeting, utilizing the array structures disclosed above. Separation surface 206 may be formed using a machine tool with a flat or curved tip, or by further removal of material from a replica of the array master. This construction is particularly useful in applications such as internally illuminated signs and raised pavement markers.

Suitable materials for retroreflective articles or sheeting of this invention are preferably transparent materials which are dimensionally stable, durable, weatherable, and easily replicated into the desired configuration. Examples of suitable materials include glass; acrylics, which have an index of refraction of about 1.5, such as Plexiglas brand resin manufactured by Rohm and Haas Company; polycarbonates, which have an index of refraction of about 1.59; reactive materials such as taught in U.S. Pat. Nos. 4,576,850, 4,582, 885, and 4,668,558; polyethylene based ionomers, such as those marketed under the brand name of SURLYN by E. I. Dupont de Nemours and Co., Inc.; polyesters, polyurethanes; and cellulose acetate butyrates. Polycarbonates are particularly suitable because of their toughness and relatively higher refractive index, which generally contributes to improved retroreflective performance over a wider range of entrance angles. These materials may also include dyes, colorants, pigments, UV stabilizers, or other additives. Transparency of the materials ensures that the separation or other shaped surfaces will transmit light through those portions of the article or sheeting.

The incorporation of either truncated and/or separation surfaces does not eliminate the retroreflectivity of the article, but rather it renders the entire article partially transparent. In some applications requiring partially transparent materials, low indices of refraction of the article will improve the range of light transmitted through the article. In these applications, the increased transmission range of acrylics (refractive index of about 1.5) is desirable. In fully retroreflective articles, materials having high indices of refraction are preferred. In these applications, materials such as polycarbonates, with refractive indices of about 1.59, are used to increase the difference between the indices of the material and air, thus increasing retroreflection. Polycarbonates are also generally preferred for their temperature stability and impact resistance.

Directly machined arrays according to the invention are formed by adjusting the height of at least one of the structures in the array. As described above, one technique for manufacturing such arrays comprises creating a plurality of geometric structures including cube corner elements by directly machining at least two sets of parallel grooves in the substrate so that groove machining forms at least one geometric structure side surface having both an optical portion and a non-optical portion. This machining may be accomplished using a novel machine tool having groove cutting means for simultaneous cutting of a plurality of different geometric structure surfaces forming multiple side surfaces on at least one side of a final groove. One example of this type of tool is shown in FIG. 16 in which tool 230 comprises groove cutting means having a first cutting surface 235, a second cutting surface 237, and a third cutting surface 239. In this embodiment, first cutting surface 235 and second cutting surface 237 are configured to form at least one geometric structure side surface having both an optical portion and a non-optical portion.

Other embodiments of this invention include creation of an article, or replicas of the article, which further modify the shape of the retroreflected light pattern. These embodiments comprise at least one groove side angle in at least one set of grooves which differs from the angle necessary to produce an orthogonal intersection with other faces of elements defined by the groove sides. Similarly, at least one set of grooves may comprise a repeating pattern of at least two groove side angles that differ from one another. Shapes of grooving tools, or other techniques, may create cube corner elements in which at least a significant portion of at least one cube corner element optical face on at least some of the cubes are arcuate. The arcuate face may be concave or convex. The arcuate face, which was initially formed by one of the grooves in one of the groove sets, is flat in a direction substantially parallel to said groove. The arcuate face may be cylindrical, with the axis of the cylinder parallel to said groove, or may have a varying radius of curvature in a direction perpendicular to said groove.

Figure 17:
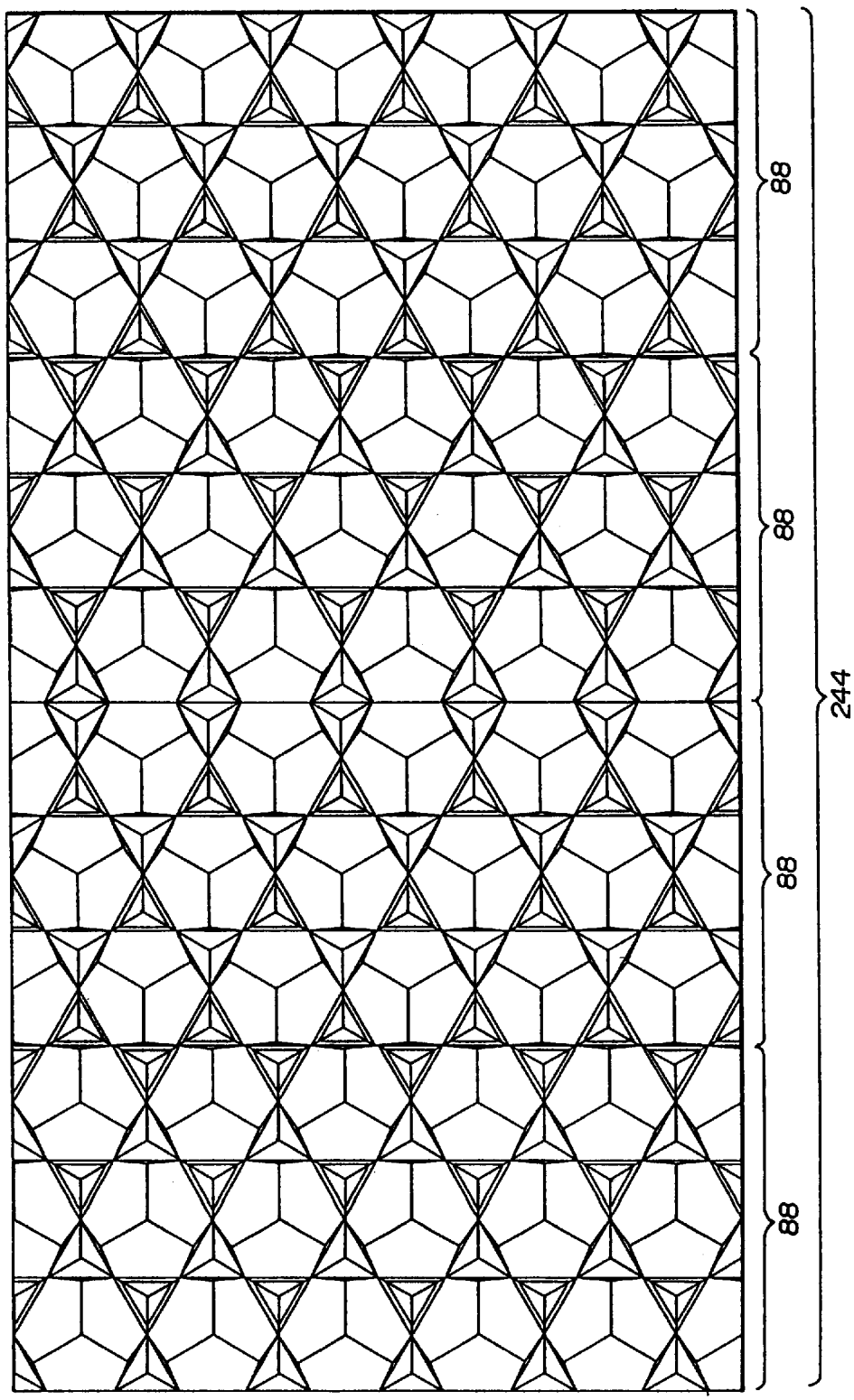
FIG. 17 is a plan view of a composite array comprising several zones of arrays.

Composite tiling is the technique for combining zones of cube corner elements having different orientations. This is used, for example, with conventional arrays to provide sheeting with a uniform appearance at high angles of incidence regardless of orientation. Referring to FIG. 17, composite array 244 comprises several zones of arrays 88. Composite arrays may comprise adjacent zones of direct machined cube corner retroreflecting element arrays including either conventional or height adjusted arrays having different configurations, or arrays with at least one geometric structure side surface having both an optical and a non-optical portion. The size of the zones should be selected according to the requirements of particular applications. For example, traffic control applications may require zones which are sufficiently small that they are not visually resolvable to the unaided human eye at the minimum expected viewing distance. This provides a composite array with a uniform appearance. Alternatively, channel marking or directional reflector applications may require zones which are sufficiently large that they can be easily resolved by the unaided human eye at maximum required viewing distance.

Figure 18:
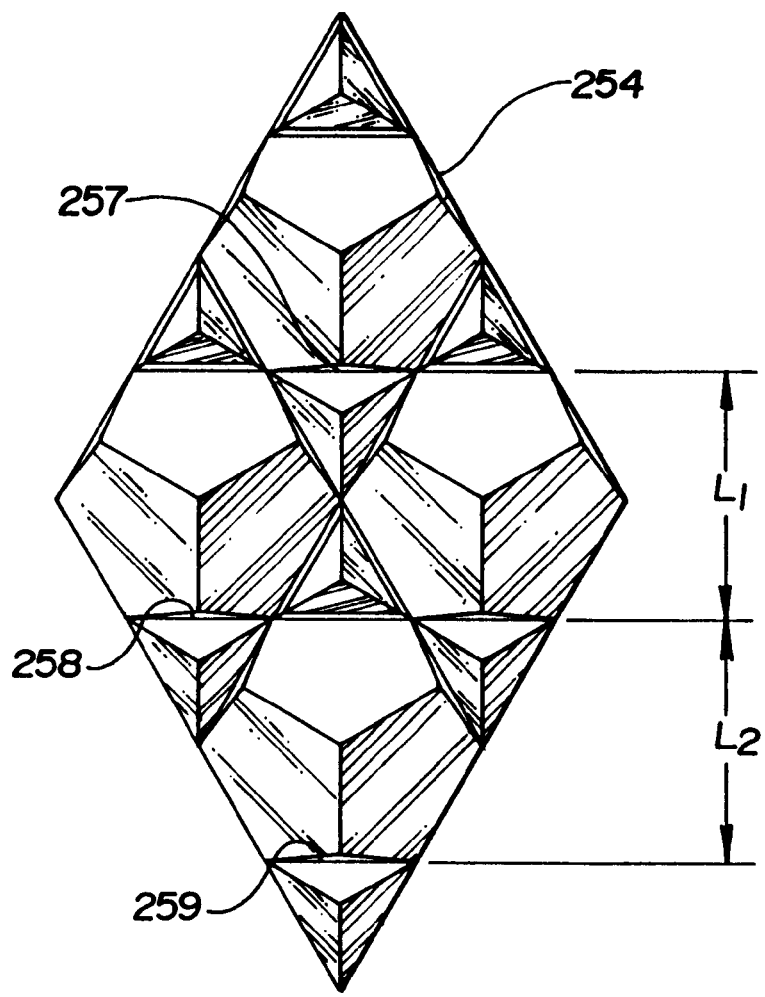
FIG. 18 is a plan view of a directly machined array with variable groove spacing.

FIG. 18 discloses array 254 which is similar to array 88 in FIG. 7 but with variable groove spacing. Grooves 257, 258, and 259 are all in the same groove set. However, as shown in this portion of the array, the spacing of grooves within at least one of the groove sets in the array is varied so that the spacing between a first groove 257 and an adjacent second groove 258 ($L_1$) differs from the spacing between the second groove 258 and an adjacent third groove 259 ($L_2$).

The process of adjusting the height of geometric structures within a retroreflective cube corner element optical array by either adjusting depth of cut or by conducting an additional height adjustment grooving step results in substantial advantages. These advantages include higher percentage active aperture at various entrance angles, thinner construction of arrays, improved processing, replication, and handling of arrays, improved optical performance of arrays, improved levels of transparencies of arrays, and improved flexibility of arrays. It is recognized that the above processes may be accomplished using machine tools of various shapes.

We claim:

1. A method of manufacturing a cube corner article, comprising:

providing a substrate having first and second surfaces, the first surface including a plurality of cube corner elements formed therein, each of the plurality of cube corner elements having three approximately mutually perpendicular lateral faces meeting in a peak; and removing at least a portion of one of the lateral faces on at least one of the cube corner elements, wherein the height of the peak on the at least one cube corner element is reduced.

2. A method according to claim 1, wherein providing the substrate further comprises providing one or more of the plurality of cube corner elements in the mold with canted axes of symmetry.

3. A method according to claim 1, wherein the step of providing the substrate further comprises providing a separation surface between at least one pair of adjacent cube corner elements.

4. A method according to claim 1, wherein providing the substrate with the plurality of cube corner elements in the first surface thereof comprises forming first, second, and third sets of grooves in the first surface of the substrate, wherein the first and second sets of grooves intersect each other, and further wherein the third set of grooves intersects both the first and second sets of grooves.

5. A method according to claim 1, wherein removing comprises machining.

6. A method according to claim 1, further comprising forming a replica of the first surface of the substrate.

7. A method of manufacturing a cube corner article comprising a plurality of cube corner elements, each cube corner element having three mutually perpendicular lateral faces, the method comprising:

providing a substrate having first and second side surfaces;

providing a first set of grooves having at least two groove surfaces in the first side surface of the substrate, wherein the first set of grooves forms one of the lateral faces on at least one of the plurality of cube corner elements;

providing a second set of grooves having at least two groove surfaces in the first side surface of the substrate, the second set of grooves intersecting the first set of grooves, wherein the second set of grooves forms another of the lateral faces on at least one of the plurality of cube corner elements;

providing a third set of grooves having at least two groove surfaces in the first side surface of the substrate, the third set of grooves intersecting the first and second sets of grooves, wherein the third set of grooves forms another of the lateral faces on at least one of the plurality of cube corner elements;

providing at least one of the sets of grooves with grooves having at least three groove surfaces.

8. A method according to claim 7, wherein providing at least one of the sets of grooves with grooves having at least three groove surfaces comprises forming the three groove surfaces at the same time.

9. A method according to claim 7, wherein providing at least one of the sets of grooves with grooves having at least three groove surfaces comprises forming at least two of the three groove surfaces at the same time.

10. A method according to claim 7, wherein providing at least one of the sets of grooves with grooves having at least three groove surfaces comprises forming each of the groove surfaces at different times.

11. A method according to claim 7, wherein the step of providing the substrate further comprises providing one or more of the plurality of cube corner elements with a canted axis of symmetry.

12. A method according to claim 7, further comprising a step of providing a separation surface in at least one of the grooves in at least one of the sets of grooves.

13. A method according to claim 7, wherein providing each set of grooves comprises machining the grooves in the first side surface of the substrate.

14. A method according to claim 7, further comprising forming a replica of the first side surface of the substrate after the sets of grooves are formed therein.

* * * * *